(12) United States Patent
Rozman et al.

(10) Patent No.: US 8,237,416 B2
(45) Date of Patent: Aug. 7, 2012

(54) MORE ELECTRIC ENGINE WITH REGULATED PERMANENT MAGNET MACHINES

(75) Inventors: Gregory I. Rozman, Rockford, IL (US); Kevin P. Roy, West Springfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 571 days.

(21) Appl. No.: 12/330,591

(22) Filed: Dec. 9, 2008

(65) Prior Publication Data
US 2010/0141028 A1 Jun. 10, 2010

(51) Int. Cl.
H02P 9/10 (2006.01)
(52) U.S. Cl. ........................................................ 322/22
(58) Field of Classification Search ..................... 290/52
See application file for complete search history.

(56) References Cited

U.S. PATENT DOCUMENTS

| | | | |
|---|---|---|---|
| 3,793,544 A * | 2/1974 | Baumgartner et al. ....... | 320/123 |
| 4,786,852 A * | 11/1988 | Cook .............................. | 322/10 |
| 5,493,200 A * | 2/1996 | Rozman et al. ................ | 322/10 |
| 5,753,989 A * | 5/1998 | Syverson et al. ............. | 310/114 |
| 5,764,036 A * | 6/1998 | Vaidya et al. .................. | 322/90 |
| 6,111,768 A * | 8/2000 | Curtiss ............................ | 363/98 |
| 6,239,996 B1 * | 5/2001 | Perreault et al. ............... | 363/89 |
| 6,275,012 B1 * | 8/2001 | Jabaji ............................ | 322/22 |
| 6,825,640 B1 | 11/2004 | Hill | |
| 6,920,023 B2 | 7/2005 | Dooley | |
| 6,936,948 B2 | 8/2005 | Bell | |
| 6,965,183 B2 | 11/2005 | Dooley | |
| 7,034,509 B2 * | 4/2006 | Kusko ............................ | 322/90 |
| 7,050,313 B2 * | 5/2006 | Huang et al. ................... | 363/54 |
| 7,053,590 B2 * | 5/2006 | Wang .............................. | 322/24 |
| 7,116,083 B2 * | 10/2006 | Kalman et al. ................ | 322/59 |
| 7,126,313 B2 | 10/2006 | Dooley | |
| 7,400,117 B1 | 7/2008 | Rozman | |
| 7,466,106 B2 * | 12/2008 | Sarlioglu et al. ............... | 322/11 |
| 7,538,521 B2 * | 5/2009 | Berenger ........................ | 322/25 |
| 7,821,145 B2 * | 10/2010 | Huang et al. ................... | 290/31 |
| 2003/0057926 A1 | 3/2003 | Huggett | |
| 2004/0090204 A1 * | 5/2004 | McGinley ..................... | 318/767 |
| 2004/0119454 A1 | 6/2004 | Chang | |
| 2005/0056021 A1 | 3/2005 | Belokon | |

(Continued)

FOREIGN PATENT DOCUMENTS
EP 1501167 1/2005

(Continued)

OTHER PUBLICATIONS
European Search Report dated Mar. 19, 2010.

Primary Examiner — Joseph Waks
(74) Attorney, Agent, or Firm — Carlson, Gaskey & Olds, PC

(57) ABSTRACT

A generator and associated power supply system has a prime mover for driving a shaft to rotate. A pair of permanent magnets is associated with the rotating shaft. A first stator winding is associated with a first of said permanent magnets, with a customer DC bus for providing a first relatively low voltage to the customer DC bus. A second of said permanent magnets is associated with a second stator winding, and an engine accessory DC bus. The engine accessory DC bus provides power to a motor controller and associated accessory motors associated with the prime mover. The engine accessory DC bus is provided with a second relatively high voltage from the second stator winding.

17 Claims, 1 Drawing Sheet

| U.S. PATENT DOCUMENTS | | | | FOREIGN PATENT DOCUMENTS | | |
|---|---|---|---|---|---|---|
| 2005/0151517 A1 | 7/2005 | Cook | | EP | 1657096 A2 | 5/2006 |
| 2006/0042846 A1 | 3/2006 | Kojori | | GB | 2422857 | 9/2006 |
| 2006/0061213 A1 | 3/2006 | Michalko | | JP | 05300640 | 11/1993 |
| 2006/0113967 A1 | 6/2006 | Dooley | | WO | 9517035 A1 | 6/1995 |
| 2006/0226721 A1 | 10/2006 | Dooley | | * cited by examiner | | |

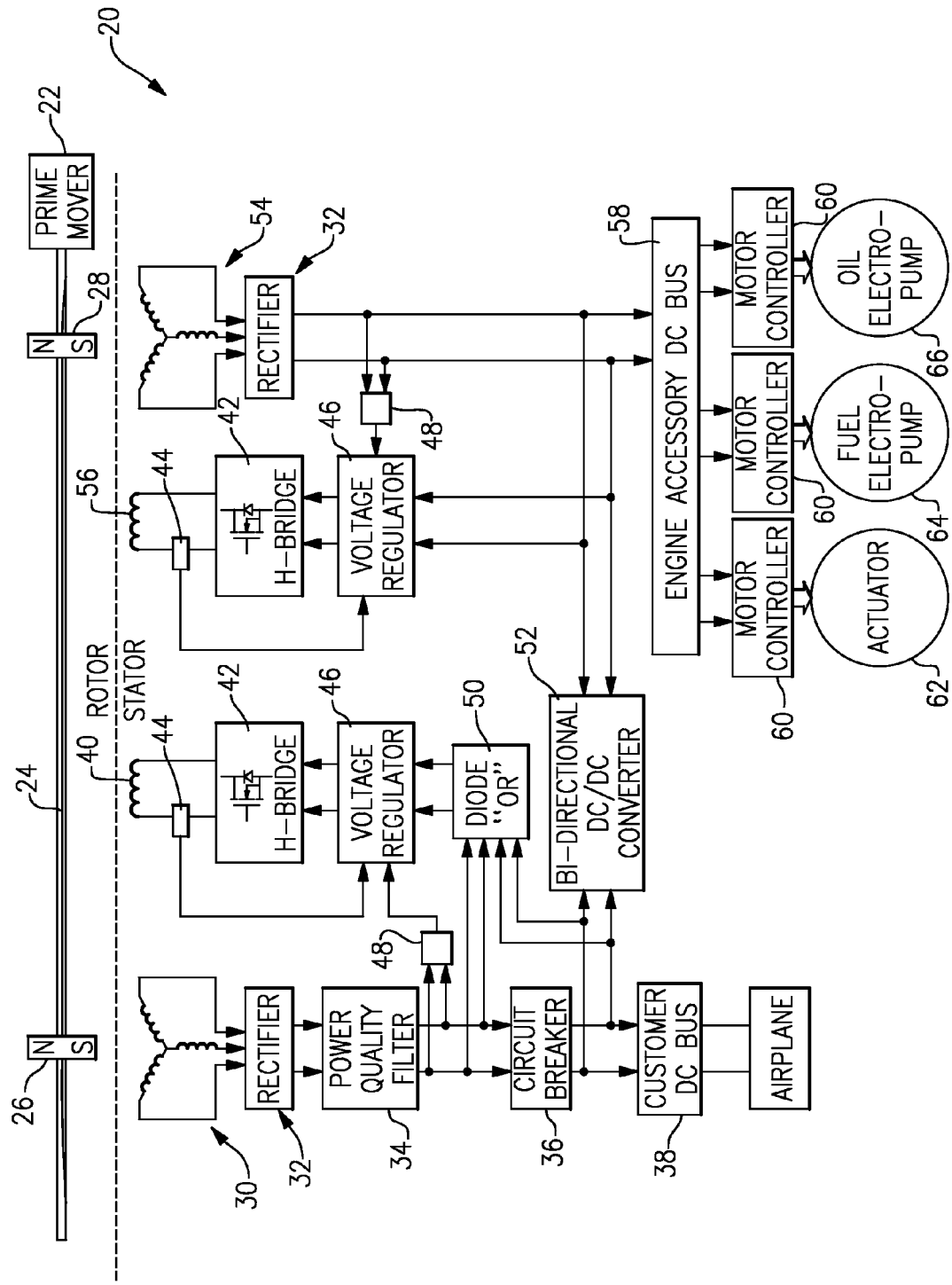

MORE ELECTRIC ENGINE WITH REGULATED PERMANENT MAGNET MACHINES

BACKGROUND OF THE INVENTION

This application relates to an electrical generation system wherein separate permanent magnet generators and associated buses are provided for a load, and for accessories associated with the generator.

Generators for generating electricity are known. One common generator is provided by a gas turbine engine, such as on an aircraft.

Recently, an electrical system associated with a gas turbine engine has been developed to provide electricity to a DC bus for providing power to various components associated with an aircraft carrying the gas turbine engine. A separate bus is provided to provide power and control signals to pumps and other motors associated with the engine itself.

One challenge with such a system is that the engine accessories tend to need increased voltage levels compared to the other components on the aircraft.

Providing such distinct voltage levels has proved challenging, and has raised cost and weight, as well as harming efficiency.

SUMMARY OF THE INVENTION

A generator and associated power supply system comprises a prime mover for driving a shaft to rotate. At least a pair of permanent magnets is associated with the rotating shaft. A first stator winding is associated with a first of said permanent magnets, with a customer DC bus for providing a first relatively low voltage to the customer DC bus. A second of said permanent magnets is associated with a second stator winding, and an engine accessory DC bus. The engine accessory DC bus provides power to a motor controller and associated accessory motors associated with the prime mover. The engine accessory DC bus is provided with a second relatively high voltage from the second stator winding.

These and other features of the present invention can be best understood from the following specification and drawings, the following of which is a brief description.

BRIEF DESCRIPTION OF THE DRAWINGS

The sole FIGURE is a schematic of an inventive generator and associated system.

DETAILED DESCRIPTION OF THE PREFERRED EMBODIMENT

A generator and electrical supply system 20 for use, such as on an airplane, includes a prime mover 22, which may be a gas turbine engine. Prime mover 22 drives a shaft 24. Permanent magnets 26 and 28 rotate with the shaft 24. A three-phase stator winding 30 is positioned adjacent the magnet 26, and supplies current through a rectifier 32, a filter 34, a circuit breaker 36, and to a customer DC bus 38. The customer DC bus 38 may supply electrical power such as to various systems and components on an airplane.

A control winding 40 is provided to control the current and voltage supplied to the bus 38. A current sensor 44 provides sensed current to a voltage regulator 46, and a voltage sensor 48 does the same. An H-bridge 42 is associated with this control circuitry. A diode OR gate 50 is associated into the circuitry to enable control power to the voltage regulator from either power quality filter 34, or from bi-directional dc/dc converter 52.

A bidirectional DC/DC converter 52 has a function to be described below.

The control side of this circuit operates as is known to control the power supplied to the customer DC bus 38. Generally, the system is provided to provide a relatively low voltage to the customer DC bus 38. In one example, this may be a 28 volt power supply.

A somewhat similar system is disclosed in U.S. patent application Ser. No. 11/839,763, filed Aug. 16, 2007, which is owned by the assignee of the present application, and titled "Engine Having Power Bus Fault Short Circuit Control With A Disconnection Switch."

In parallel with the power supply to the customer DC bus 38, the magnet 28 rotates adjacent stator windings 54. A control winding 56 is associated with components similar to the control winding 40.

This power is supplied separately to an engine accessory DC bus 58. The power supplied from bus 58 passes to motor controller 60 which separately controls individual components associated with the engine such as an actuator motor 62, a fuel pump 64, or an oil pump 66.

The permanent magnet 28 and its associated windings 54 and 56 are configured such that they will provide a relatively high voltage, for example, on the order of 270 volts to the controllers and pumps 60, 62, 64, and 66.

With the present invention, a relatively simple system is able to provide distinct voltages to the two buses 38 and 58.

The DC/DC power converter 52 utilizes a current mode control to enable optimized battery charging during the generation mode, but also enables power to the accessory bus 58 from the aircraft's battery during engine start. Also, the bi-directional feature allows either power supply to direct power to the other, should there be some failure.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A generator and associated power supply system comprising:
   a prime mover for driving a shaft to rotate;
   at least a pair of permanent magnets associated with said shaft;
   a first stator winding set associated with a first of said permanent magnets, said first stator winding set associated with a customer DC bus, and providing a first voltage to said customer DC bus, said first winding set including a three-phase stator winding and a control winding; and
   a second of said permanent magnets being associated with a second stator winding set, and communicating with an engine accessory DC bus, said engine accessory DC bus providing power to a motor controller and an associated motor for an accessory associated with said prime mover, said engine accessory DC bus being provided with a second voltage from said second stator winding set, said second stator winding set including a three-phase stator winding and a control winding, and said second voltage being higher than said first voltage; and
   said engine accessory bus communicates with a plurality of motor controllers and a plurality of motors, and said plurality of motors includes at least a fuel and oil pump motor for said prime mover.

2. The system as set forth in claim 1, wherein said prime mover is a gas turbine engine.

3. The system as set forth in claim 1, wherein said customer DC bus is associated with components on an airplane.

4. The system as set forth in claim 1, wherein both of said winding sets ultimately communicate with a bi-directional DC/DC converter.

5. The system as set forth in claim 1, wherein said first voltage is on the order of 28 volts and said second voltage is over 100 volts.

6. The system as set forth in claim 5, wherein said second voltage is on the order of 270 volts.

7. The system as set forth in claim 6, wherein said first voltage is 28 volts and said second voltage is 270 volts.

8. The system as set forth in claim 1, wherein a current sensor provides a sensed current to a regulator, and said regulator communicating with said control winding in each of said first and second winding sets.

9. A generator and associated power supply system comprising:
   a prime mover for driving a shaft to rotate;
   at least a pair of permanent magnets associated with said shaft;
   a first stator winding associated with a first of said permanent magnets, said first stator winding associated with a customer DC bus, and providing a first voltage to said customer DC bus;
   a second of said permanent magnets being associated with a second stator winding, and communicating with an engine accessory DC bus, said engine accessory DC bus providing power to a motor controller and an associated motor for an accessory associated with said prime mover, said engine accessory DC bus being provided with a second voltage from said second stator winding, said second voltage being higher than said first voltage;
   both of said windings ultimately communicating with a bi-directional DC/DC converter; and
   said bi-directional DC/DC converter, allows the power from said first stator winding to be also directed to said engine accessory DC bus, and allows the power from said second stator winding to be selectively sent to said customer DC bus, as necessary.

10. The system as set forth in claim 9, wherein said engine accessory bus communicates with a plurality of motor controllers and a plurality of motors.

11. The system as set forth in claim 10, wherein said plurality of motors include at least a fuel and oil pump motor for said prime mover.

12. The system as set forth in claim 9, wherein said first voltage is on the order of 28 volts and said second voltage is over 100 volts.

13. The system as set forth in claim 12, wherein said first voltage is 28 volts and said second voltage is 270 volts.

14. A generator and associated power supply system comprising:
   a prime mover for driving a shaft to rotate;
   at least a pair of permanent magnets associated with said shaft;
   a first stator winding set associated with a first of said permanent magnets, said first stator winding set associated with a customer DC bus, and providing a first voltage to said customer DC bus;
   a second of said permanent magnets being associated with a second stator winding set, and communicating with an engine accessory DC bus, said engine accessory DC bus providing power to a plurality of motor controllers and associated motors for accessories associated with said prime mover, and including at least a fuel pump motor and an oil pump motor, said engine accessory DC bus being provided with a second voltage from said second stator winding set;
   said prime mover being a gas turbine engine, said customer DC bus being associated with components on an airplane;
   both of said winding sets ultimately communicate with a bi-directional DC/DC converter, that allows the power from said first stator winding set to be also directed to said engine accessory DC bus, and allows the power from said second stator winding set to be selectively sent to said customer DC bus, as necessary; and
   said first voltage being on the order of 28 volts and said second voltage being on the order of 270 volts.

15. The system as set forth in claim 14, wherein each of said first and second stator winding sets includes a three-phase stator winding, and a control winding.

16. The system as set forth in claim 15, wherein a current sensor provides a sensed current to a regulator, and said regulator communicating with said control winding in each of said first and second winding sets.

17. The system as set forth in claim 14, wherein said first voltage is 28 volts and said second voltage is 270 volts.

* * * * *